(12) United States Patent
Marchetti

(10) Patent No.: US 12,284,430 B2
(45) Date of Patent: Apr. 22, 2025

(54) CONTAINER FOR VIDEO OR PHOTOGRAPHIC IMAGE-TAKING APPARATUSES

(71) Applicant: Marelli Europe S.p.A., Corbetta (IT)

(72) Inventor: Massimo Marchetti, Corbetta (IT)

(73) Assignee: MARELLI EUROPE S.p.A., Corbetta (IT)

(*) Notice: Subject to any disclaimer, the term of this patent is extended or adjusted under 35 U.S.C. 154(b) by 98 days.

(21) Appl. No.: 18/300,764

(22) Filed: Apr. 14, 2023

(65) Prior Publication Data

US 2023/0336854 A1 Oct. 19, 2023

(30) Foreign Application Priority Data

Apr. 15, 2022 (IT) .......................... 102022000007619

(51) Int. Cl.
*H04N 23/51* (2023.01)
*G03B 17/02* (2021.01)
*H04N 23/50* (2023.01)

(52) U.S. Cl.
CPC ............. *H04N 23/51* (2023.01); *G03B 17/02* (2013.01); *H04N 23/555* (2023.01)

(58) Field of Classification Search
CPC ...... H04N 23/51; H04N 23/555; H04N 23/50; G03B 37/005
See application file for complete search history.

(56) References Cited

FOREIGN PATENT DOCUMENTS

| CN | 108871018 A | 11/2018 |
|---|---|---|
| CN | 213513973 U | 6/2021 |
| DE | 102011122771 B4 | 4/2018 |
| KR | 101140863 B1 | 5/2012 |

OTHER PUBLICATIONS

Translation of Korean Pub. No. KR101140863B1 (Year: 2011).*
Search Report for Italian Patent Application No. 202200007619 dated Nov. 21, 2022.

* cited by examiner

*Primary Examiner* — Nicholas G Giles
(74) *Attorney, Agent, or Firm* — Howard & Howard Attorneys PLLC

(57) ABSTRACT

A container for video or photographic image-taking apparatuses comprising a casing that includes a housing for housing an image-taking apparatus. The casing includes a transparent window, an inner surface of which faces a lens of the image-taking apparatus. The casing further includes a sheet wound on itself in a spiral so as to define between its own facing surfaces a spiral-shaped path. The housing being comprised in the innermost turn of the spiral-shaped path. The container further includes a delivery duct coupled to the housing that is configured to convey a temperature-regulating gas at a given temperature into the housing and into the spiral-shaped path.

9 Claims, 4 Drawing Sheets

CONTAINER FOR VIDEO OR PHOTOGRAPHIC IMAGE-TAKING APPARATUSES

CROSS-REFERENCE TO RELATED APPLICATIONS

The present application claims priority to and all the benefits of Italian Patent Application No. 102022000007619, filed on Apr. 15, 2022, which is hereby expressly incorporated herein by reference.

BACKGROUND OF THE INVENTION

1. Field of the Invention

The present invention relates to a container for video or photographic image-taking apparatuses including a casing that comprises a housing for housing an image-taking apparatus. The casing includes a transparent window, for example made of glass or plastic, an inner surface of which faces a lens of said image-taking apparatus.

2. Description of the Related Art

Apparatuses for acquiring videos or photographic images, i.e., for example films or photographs, respectively, such as video cameras or photographic cameras, may need to be inserted into containers, for example to protect them when they are used in an environment that may damage them on account of the presence of harmful gases or temperature conditions.

Hence, in general, the image-taking apparatus is inserted into a container that has a wall, facing the lens of the image-taking apparatus itself, which comprises a transparent portion, thus, for example, a window made of glass, crystal, quartz, or transparent plastic material.

However, the conditions of temperature and humidity of the external environment operating in which is the image-taking apparatus housed in the container (which may, for example, be an environmental camera with an atmosphere controlled in terms of temperature and humidity for carrying out tests) may be such as to bring about an excessive heating or cooling of the image-taking apparatus, for example not compatible with the operating-temperature ranges of its electronic components. Moreover, in given weather conditions, condensate or frost may be formed on the optical parts, thus jeopardizing the quality of the images taken by the apparatus.

SUMMARY OF THE INVENTION

The object of the present invention is to provide a container that will enable image-taking apparatuses to work in weather conditions that are critical for the characteristics of the apparatus itself, at the same time eliminating (or reducing) the effect of condensate or frost that might form on the optical parts.

According to the present invention, the above object is achieved thanks to a container for video or photographic image-taking apparatuses comprising a casing that includes a housing for housing an image-taking apparatus. The casing includes a transparent window, an inner surface of which faces a lens of the image-taking apparatus. The casing further includes a sheet wound on itself in a spiral so as to define between its own facing surfaces a spiral-shaped path. The housing is comprised in the innermost turn of the spiral-shaped path. The container further includes a delivery duct coupled to the housing that is configured to convey a temperature-regulating gas at a given temperature into the housing and into the spiral-shaped path. In addition, the present invention is also directed toward a corresponding method for operation of the container.

Other objects, features and advantages of the present invention will be readily appreciated as the same becomes better understood after reading the subsequent description taken in connection with the accompanying drawings.

BRIEF DESCRIPTION OF THE DRAWINGS

The invention will be described with reference to the annexed drawings, which are provided purely by way of non-limiting example and in which.

DETAILED DESCRIPTION OF THE INVENTION

In the ensuing description, one or more specific details are illustrated, aimed at enabling an in-depth understanding of examples of embodiments of this description. The embodiments may be obtained without one or more of the specific details, or with other methods, components, materials, etc. In other cases, known structures, materials, or operations are not illustrated or described in detail so that certain aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to a specific embodiment. Moreover, particular conformations, structures, or characteristics may be combined in any adequate way in one or more embodiments.

The references used herein are provided merely for convenience and hence do not define the sphere of protection or the scope of the embodiments.

Figure 1:
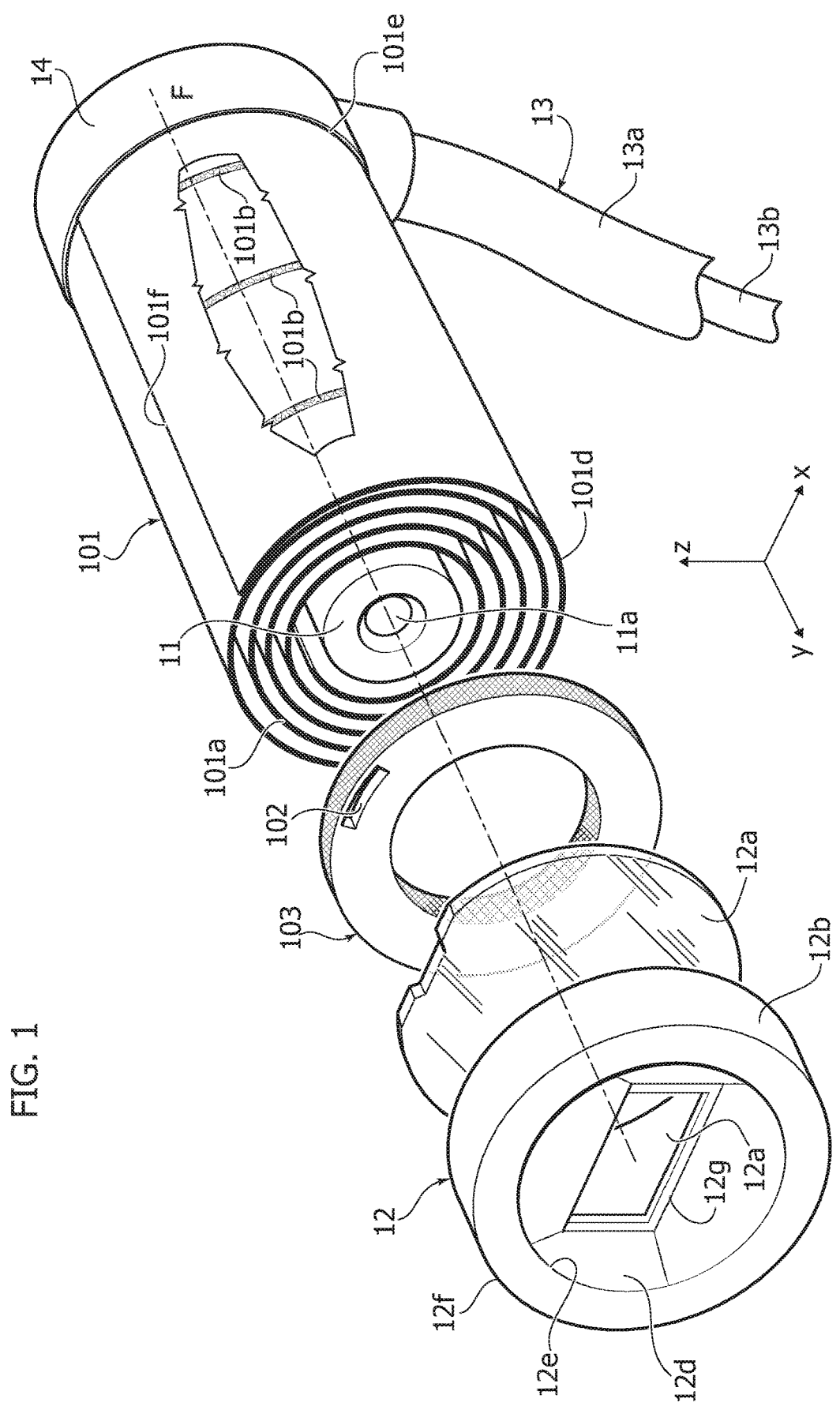
FIG. 1 is a schematic perspective view of an embodiment of the container described herein.

FIG. 1 is a schematic perspective view of the container 10 for image-taking apparatuses described herein, which comprises a casing 100, having, in the example, a cylindrical shape, which is closed at the front and rear bases by a front cover 12 and rear cover 14, respectively. In FIG. 1, the front cover 12 is illustrated separated from the front base of the cylinder defined by the casing 100 so that there can be seen, inside the casing 100, an image-taking apparatus 11, for example a video camera or a photographic camera, a lens 11a of which faces in the direction of the front cover 12; i.e., its optical axis F passes through the front cover 12.

Represented for convenience of reference in FIG. 1 is a triad of cartesian axes comprising a horizontal axis X, substantially in the direction of the width of the cylinder defined by the casing 100, a horizontal optical axis Y, in the direction of depth, parallel to the optical axis F and to the longitudinal axis of the cylinder, and a vertical axis Z.

Figure 2:
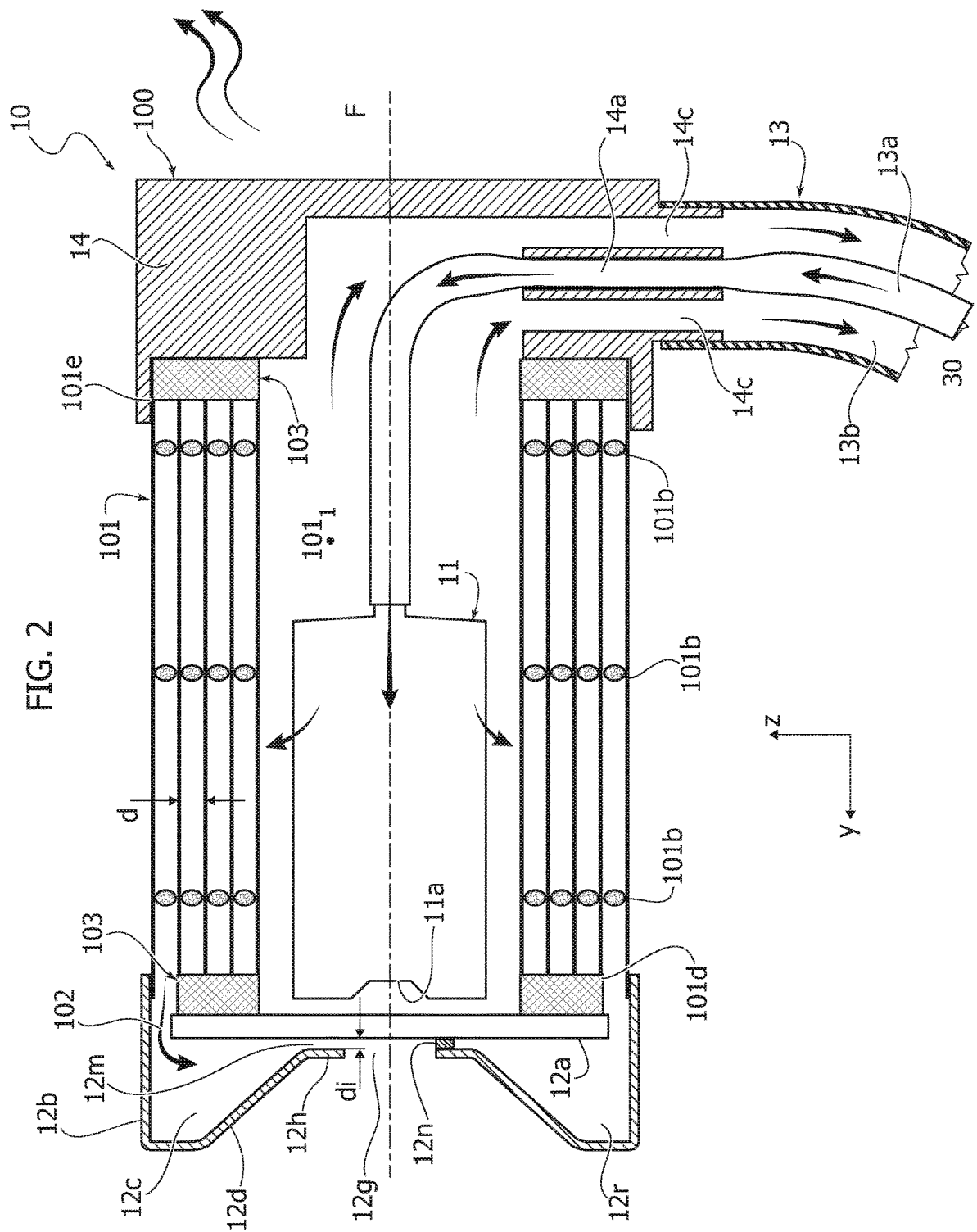
FIG. 2 is a lateral sectional view of the embodiment of the container of FIG. 1.
Figure 3B:
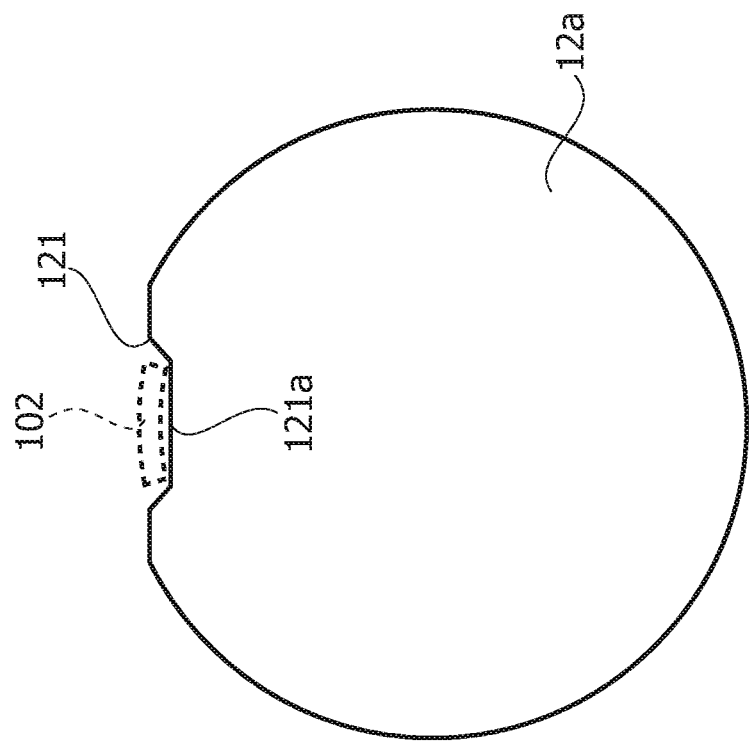
FIG. 3B is a front view of a transparent window comprised in the container of FIG. 1.
Figure 3A:
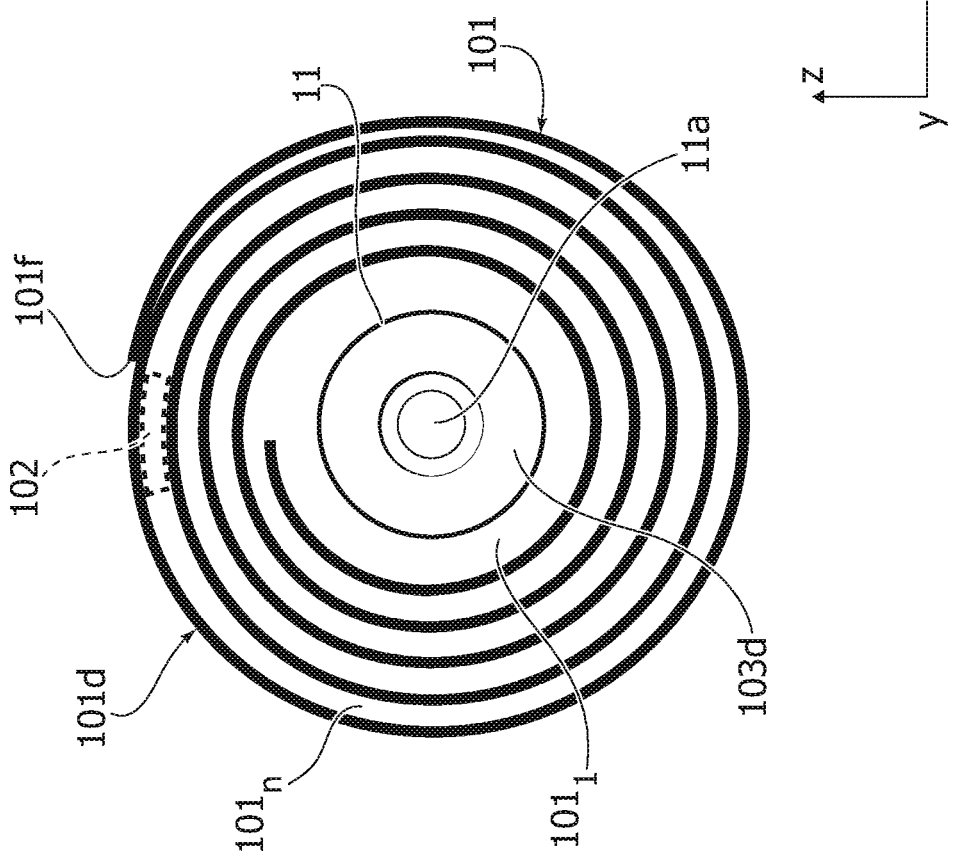
FIG. 3A is a front view of a casing included in the container of FIG. 1.

With reference also to FIG. 2, where the container for image-taking apparatuses is illustrated in lateral sectional view, i.e., sectioned through a vertical plane parallel to the plane YZ passing through the principal dimension of the container 10, i.e., the length of the cylinder defined by the casing 100, parallel to the axis Y, substantially corresponding to the optical axis F, and with reference to FIG. 3A, where the casing 100 is illustrated in front view, the aforesaid casing 100 comprises a substantially rectangular sheet of rollable material, rolled up on itself 101 in a spiral about one of its dimensions, namely a rolling dimension, preferably the longer one of the sheet 101, i.e., the length (parallel to the axis Y in the example), so as to define a spiral-shaped path 101a between the walls of the facing turns. Such rollable material is resistant to the operating temperatures, is preferably a poor conductor of heat, for example polycarbonate or Teflon.

Positioned within a first innermost turn $101_1$, which defines a cylindrical housing, is the image-taking apparatus 11. The first innermost turn $101_1$ hence has a diameter greater than the maximum dimension of the image-taking apparatus 11, which is, for example, a Microsoft Life Cam webcam, in the direction normal to the axis of the cylindrical casing 100, which corresponds to the optical axis F. It should be noted that by the term "turn" is in general meant the part of spiral described by a complete turn about the pole of the spiral, which in this case lies substantially on the optical axis F. The first innermost turn $101_1$ may hence correspond, for example, to the first turn of the spiral defined by the sheet 101, its diameter being, for instance, substantially a mean diameter. Other subsequent turns may be defined in a similar way, even though possibly the reference with respect to which the turn is calculated may be chosen differently.

As shown in FIG. 1, starting from the first innermost turn $101_1$, the rolled-up sheet 101 is wound a plurality of times about the aforesaid winding dimension to define a corresponding plurality of turns $101_1, \ldots, 101_n$ having a diameter increasing with the number of turns. The turns $101_1, \ldots, 101_n$ are not in contact with one another, except for the outermost turn, which is sealed on the preceding turn in a point 101f of the spiral-shaped path, i.e., along the edge of the rolled-up sheet 101, as illustrated in FIG. 1, but are set apart by a distance d so as to define between them the spiral-shaped path 101a. For this purpose, spacers 101b are provided, obtained, for example, by setting one or more wires with a thickness substantially equal to said distance d and a distance between them, for example 2 cm, slightly smaller (to enable sealing of the outer part) than that of the sheet 101 in given positions along the dimension of winding, i.e., the length of the sheet 101. For example, as illustrated in FIG. 1, these spacers are two wires 101b arranged approximately at one third and two thirds of the length of the sheet 101 in the direction perpendicular thereto. When the sheet 101 is wound, the above spacer wires 101b are located between the facing turns, thus making it possible to keep open a spiral-shaped path 101a for the passage of air, as illustrated in FIGS. 3A and 3B, which show the rolled-up sheet 101 in front view, i.e., the front base of the cylinder. For simplicity, the spacers 101b are not represented in FIGS. 3A and 3B. Moreover, the above wires 101b are not of constant thickness, but have restrictions, the thickness of which is smaller than the distance d, to render uniform the flow of air also in the longitudinal direction. For example, they are obtained with copper braids that have a substantially sinusoidal envelope, which hence leaves free gaps for the passage of air. The end of the sheet that corresponds to the outermost turn is sealed on the part of the sheet that forms the last (outermost) turn, thus defining a cylinder closed externally along its entire cylindrical surface.

The sheet 101 of the casing 100, wound on itself in a spiral, comprises two open faces 101d, 101e orthogonal to the winding axis, which corresponds to the main axis of the cylinder and to the optical axis F in the example. The faces 101d, 101e are closed, respectively, by the front cover 12 and by the rear cover 14.

On the turns along the two ends that constitute the two bases of the cylinder formed by the rolled-up sheet 101, is set a seal 103, obtained, for example, by applying between the turns a layer, for example of one or two millimeters of sealing material such as silicone or some other material compatible with the temperature and materials. This sealing cover 103 is applied only on the turns $101_1, \ldots, 101_n$ of the container 10, so as to seal the spiral-shaped path 101a, but not in a portion of face 103d corresponding to the inside of the innermost turn $101_1$ where the optics of the image-taking apparatus 11 is located, as may be seen more clearly in FIG. 3A. Moreover the seal leaves free an opening 102 provided between the last two outermost turns a little before the point of joining, or sealing, 101f Hence, a cylindrical container is obtained with an outer surface sealed by the join between the last two turns, an inner surface that houses the image-taking apparatus, the first turns of which are separated by spacers and are hence open to the passage of air, and an opening 102 in the front base of the cylinder, between the last two turns, which allows exit of part of the air introduced into the cylinder, thus getting it to pass through all the turns.

On the front base 101d of the cylinder, a transparent window is applied, in the example in the form of a disk, 12a, of transparent material, for example glass or some other suitable transparent material, that covers and reinforces the seal 103. The transparent window 12a has a shape and dimensions such as to leave uncovered at least a portion 102 of the front face 101d in FIG. 1 corresponding to the opening or passage 102 in the sealing layer 103. In other words, the transparent window 12a seals, for the front part of the cylinder that defines the container 101, the area in which the image-taking apparatus is housed. In one embodiment, in order to maximize the flow of air in the spiral-shaped path 101a towards the opening 102, the transparent window 12a, as illustrated in FIG. 3B, covers the turns but has a shape such as to leave uncovered the opening 102 in a position corresponding to the outermost turn, or else has a radius slightly smaller than the distance of the opening 102 from the center and in any case does not cover the opening 102 itself.

The image-taking apparatus 11 is arranged with a lens of its own the optical axis F of which lies substantially along the main axis of the container 10. On the side that the image-taking apparatus 11 faces, the container 10 is closed by the front cover 12, which comprises a circular frame, substantially in the form of a circular ring with an external diameter 12f and an internal diameter 12e, suited to being fitted and sealed, for example via a projecting part 12b on the portion corresponding to the external diameter 12f of the container 100 (here considered not taking in account the thickness of the wall of the frame) that projects in the direction perpendicular to the plane of the frame, towards the rolled-up sheet 101, on the base of the cylinder defined by the rolled-up sheet 101 coated with the sealing cover 103.

Within the circular frame, in particular within the internal diameter 12e, the cover 12 has a cup-shaped, i.e., substantially frustoconical, wall 12d, which is tapered along the optical axis F in the direction of the lens 11a and terminates in a plane bottom 12h, in the example substantially rectangular, which comprises along its perimeter a through opening 12g, in the example having a rectangular shape. The aforesaid through opening 12g and plane bottom 12h internally face the transparent window 12a, perpendicular to the optical axis F of the image-taking apparatus 11 and parallel to the aforesaid base 13d of the cylinder, which protects the lens 11a of the image-taking apparatus 11. The opening 12g is positioned in such a way as to be traversed by the optical axis F. The opening 12g has a shape and position such as to allow the lens 11 to frame completely its optical field. The transparent window 12a, as has been said, may in general also have a substantially circular shape with a diameter, for example, substantially comprised between the external diameter 12f and the internal diameter 12e of the circular ring defined by the cover 12. However, the shape of the transparent window 12a is such as to leave uncovered the opening 102 in the sealing cover 103 so as to allow the air to traverse the spiral-shaped path 101a and to exit towards the front cover 12. As indicated more clearly with reference to FIG. 3B, for this purpose the transparent window 12a has, for example, a part of its perimeter that is flattened along a horizontal chord 121 (i.e., parallel to the plane XY). The above opening 102 has, for example, a width corresponding to a sector of approximately 10-20° of the circumference defined by the base 101d of the cylinder defined by the rolled-up sheet 101, and a position thereof is indicated in the lateral sectional view of FIG. 2 and in the front view of FIG. 3A (where the sealing cover 103 is not, however, illustrated for simplicity).

As may be seen more clearly in FIG. 2, which is a lateral sectional view, along a vertical plane passing through the main axis of the cylinder defined by the rolled-up sheet 101 (here corresponding to the optical axis F), between the outer surface of the transparent window 12a and the inner surface of the front cover 12, since, as described, the cover 12 has a cup-shaped wall 12d, a top gap 12c is defined. In general, the cup-shaped wall 12d defines a gap all around the window 12a, but denoted by 12c is the top portion above the horizontal top side of the opening 12g. The through opening 12g is, on the other three sides, substantially in contact with the transparent window 12a (also using a ridge 12n as described hereinafter) while on the top side it remains at a distance therefrom of, for example, one or two tenths of a millimeter, thus defining a vertical duct 12m, i.e., with flow of the air parallel to the vertical axis Z, in the form of a slit with a width in the direction X much larger (at least by a factor 10) than the thickness in the direction Y (second distance di). In the example illustrated, the cover 12, between the larger diameter 12f and the smaller diameter 12e, has a vertical wall, at a first distance from the passage 102 of, for example, approximately 20 mm, whereas the opening 12g of the cover 12 is at a second distance di, less than the first distance, in the example of 0.1 mm, i.e., almost in contact with the transparent window 12a so that the circumference with the smaller diameter 12e is connected by the cup-shaped wall 12d, which in cross section appears as a wall oblique to the vertical plane bottom 12h, around the rectangular opening 12g. The oblique wall is, in particular, part of a substantially conical surface that connects the smaller diameter circle to the vertical plane region 12h, which is substantially a rectangular frame around the opening 12g and itself is at the second distance from the transparent window 12. Hence, a gap 12c is obtained with the transparent window 12a that, in the viewed in the lateral section of FIG. 2, is wider at the passage 102 and narrower at the opening 12g, where the vertical plane region 12 defines, with the outer surface of the window 12a, an outlet mouth in the vertical direction (parallel to the axis Z), having the same width as the opening 12g. The plane bottom 12h that comprises the rectangular window 12g is in contact with the transparent window via a ridge 12n, for example approximately 0.1 mm, substantially equal to the second distance di, which runs along approximately three quarters of its perimeter, in the example a rectangular perimeter, hence along the bottom side and the lateral sides. In this way, the top side of the opening 12g remains at a distance from the window 12a (in particular, in the direction of the axis Y), thus forming an opening that defines the vertical duct 12m. The air that exits from the opening 102 and enters the gap 12c is forced to exit through the vertical duct 12m, thus creating a flow of air that is substantially much wider (in the direction X) than it is thick (in the direction Y), basically a blade of air that skims the surface of the transparent window 12a in just one direction, in the example from the top down along the axis Z. The vertical duct 12m has a small thickness, equal to the second distance di, for example 0.1 mm, so as to supply a jet of air at an increased speed as a result of the reduction in diameter. The width of the opening of the vertical duct 12m in the direction X, or orthogonal to the optical axis, is preferably equal to the width of the transparent window or a little less. In the example described, with a width of the cover 12 of 48 mm, the opening may, for instance, have a width 30 mm in the direction X. For clarity, for the purposes of the present description, the term "horizontal" as used here refers to the directions parallel to the optical axis F, and the term "vertical" refers to the directions orthogonal thereto, and in the aforesaid vertical directions, reference to top or upward direction refers to the direction towards the position of the opening 102, and the term "downwards" refers to the opposite direction. Of course, it is clear that the container 100 may then be set in any other position in space.

In variant embodiments, the cover 12 may have different shapes. However, it is shaped so as to form at the opening 12g a vertical conveying duct 12m, which is a portion of the gap 13c, which conveys the air in a direction parallel to the outer surface of the transparent window 12; i.e., the section of passage, or outlet section, of the outlet portion of the duct 12m lies in a plane substantially perpendicular to the outer surface of the transparent window 12a, and the perimeter of the outlet section is substantially tangential thereto; namely, the section of passage corresponding to the aforesaid outlet section, which is rectangular in the example, has its major side neighboring on or tangential to the outer surface of the transparent window 12a.

As has been said, the transparent window 12a does not extend as far as to cover the opening 102. For example, it has a diameter smaller than the external diameter 12f of the cover 12 (but for the thickness of the wall of the cover 12) or else, as illustrated in FIG. 3B, the circumference defined by the transparent window 12a is flattened by removing therefrom a part above a chord 121. This chord 121 may be at a height (height along the axis Z) corresponding to or smaller, for example, than the height of the lower part of the opening 102. In the example illustrated in FIG. 3B, the chord 121 is at a height such that it would pass through the opening 102. Consequently, in an area corresponding to the opening 102 a shaping 121a of the chord line 121 is carried out so as to follow the perimeter of the opening 102 underneath the chord 121. In other variant embodiments, the transparent window 12a may have a shape and dimensions such as to cover the entire opening 102, and for example a passage shaped like a rectangular window, for instance, substantially congruent with the shape of the opening 102, is obtained in the transparent material of the window 12a if the characteristics of the transparent material, for example, so allow. In any case, the shape of the transparent window 12a is such as to allow the opening 102 to give out directly onto the gap 12c. Since the gap 12c is formed between the vertical walls of the cover 12 and of the transparent window 12a, a flow of air coming from the spiral-shaped path 101a is conveyed in the direction parallel to the aforesaid walls, and hence to the transparent window set in front of the lens, along the entire outer surface congruent with the opening 21g, eventually coming out in a vertical duct 12m that opens at the edge of the internal diameter of the cover 12, in the direction substantially tangential to the outer surface of the transparent window 12a.

On the rear part of the container 10, the turns $1011, \ldots, 101n$ are sealed to the rear cover 14 via the seal 103. The rear cover 14 has a connector that enables coupling to a delivery duct, or inlet duct, 13. In one embodiment, the connector, which couples to an outer tube has a central hole 14a, through which an air-inlet tube 13a passes. On the connector itself, in the area comprised between the hole 14a and the seat for the tube 13b (which is concentric to the tube 13a) two or more holes 14c are provided appropriately sized to allow exit of approximately two thirds of the air introduced into the container (the remaining air will exit from the duct 12m).

The flow of air is hence conveyed by an inlet duct 13 (which is coupled via a rear cover 14) into the apparatus 11 in the innermost turn $101_1$ of the rolled-up sheet 101. The base of the cylinder defined by the rolled-up sheet 101, opposite to the one that the lens of the image-taking apparatus 11 faces, i.e., the rear face 101e, is itself coated with a sealing cover 103, which, however, leaves free the inner surface to the innermost turn $101_1$ through which the inlet tube 13 passes. The above air-inlet tube 13, as may be seen more clearly in FIG. 2, is a coaxial tube that comprises an air-inlet inner tube 13a and an outer tube 13b, of larger diameter, which is coaxial to the inner tube 13a and contains it. The tube 13 is, for example, made of silicone, PVC or some other non-porous material, resistant to the operating temperatures. The above inlet tube 13 passes through the rear cover 14, which is a box-shaped body that comprises, in particular in its lower part as illustrated in FIG. 2, an inlet through hole 14a (or channel, according to the axial length), which couples to the inner tube 13a for inlet of air into the innermost turn $101_1$ where the image-taking apparatus 11 is located—in particular, the inner tube 13a is inserted, in the example illustrated, into the body of the apparatus 11; and an outer duct 14b, which couples to the coaxial outer tube 13b to allow a part of the air introduced to leave the container 10 through two or more through holes or channels 14c, defined between the inlet through hole 14a and the connector on which the tube 13b is fitted. Another part of the air introduced exits, as has been said, from the front cover 12.

Hence, in the container 10 described herein, the air 30, or a temperature-regulating gas, for example at room temperature (e.g., 25° C.), is conveyed via an inlet, for example, via a pump, through the inner tube 13a. The cylindrical casing 100, as has been said, is obtained from a sheet 101 of plastic material wound in a spiral so as to define the spiral-shaped path 101a from the inside, where the tube 13 for the compressed air is connected, to the outside, i.e., towards the turns 101 with larger diameters. The container 10 is immersed in the environment 40 of the chamber, for example, a climatic chamber, that has a respective chamber temperature, for instance, 80° C.

The air 30 at room temperature (for example, 23° C.) enters the image-taking apparatus 11, or arrives in its immediate vicinity, if the apparatus is fluid-tight, a part of this air traverses the turns from the innermost turn, heating up (or cooling down if the temperature of the external environment 40 is lower) progressively in the spiral path 101a towards the outer turns, reaching a temperature close to that of the external environment 40, for example that of the chamber (e.g., 80° C.). In this way, the apparatus 11 is kept at a temperature very close to that of the air 30 introduced, whereas the gap 12c conveys the air at a temperature close to the temperature of the external environment 40 along the outer surface of the transparent window 12a, preventing the drops of condensate from sticking to the latter. The fact that the temperature of the air blown is close to that of the outer surface of the transparent window minimizes formation of condensate thereon.

In the example described herein, the external diameter of the cover 12 is 48 mm, the length of the container 100 including the lids 12 and 14 is 110 mm, the camera 11 has a cylindrical body with a diameter of 25 mm, the distance d between the turns is 0.7 mm, and the distance of the vertical duct 12m is 0.1 mm.

Moreover, the casing 100 has a number n of turns equal to 6, and the pressure of the compressed air introduced is approximately 1 atm, which enables use of the device located in a climatic chamber at a chamber temperature ranging from −40° C. to +90° C., with a relative humidity of 95% at 45° C., keeping the temperature of the internal camera 11 between 10° C. and 50° C. The air 30 introduced into the inlet tube typically has a temperature of 25° C. and is preferably filtered and dried to prevent any accumulation of particles of dust or water that might deposit on the optical parts of the device.

With reference to FIG. 2, since the cover 12 is mainly formed by a circular frame, it defines a gap 12r in the lower part of the cover 12, having a shape substantially similar to that of the gap 12c. However, on the gap 12r, there does not give out a passage like the passage 102, and preferably the duct corresponding to the duct 12m is closed by a projecting portion, the ridge 12n, as illustrated in FIG. 2. The aforesaid gap 12r may, however, be used for housing a heater, for heating the air that exits from the passage 102, where necessary. In variant embodiments, it is possible to provide a passage similar to the passage 102 also in the portion of outer turns facing the bottom gap 12r, leaving open the vertical air-conveying duct corresponding to the duct 12m. In general, since the cover has a symmetry of rotation and consequently also the gap has a toroidal shape, it is possible to provide one or more openings 102 in other points along the circumference of the outermost turns. In this case, it may be convenient either to orient the rectangle of the opening 12g and the rectangle of the plane bottom 12h accordingly or else to make these elements of a circular shape.

Figure 4B:
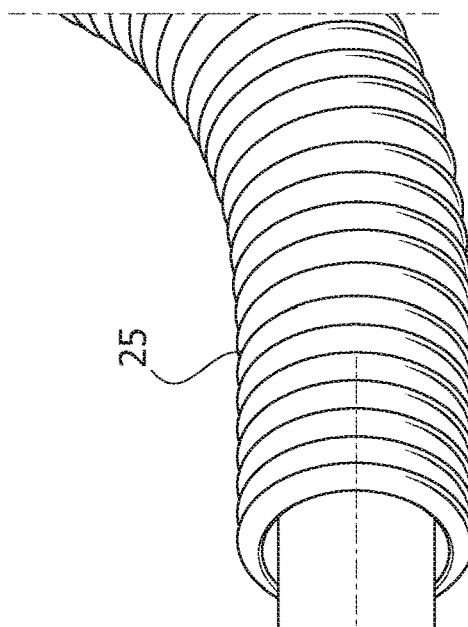
FIGS. 4A and 4B are a partial lateral sectional view and a perspective view, respectively, of elements of a variant embodiment of the container described herein.
Figure 4A:
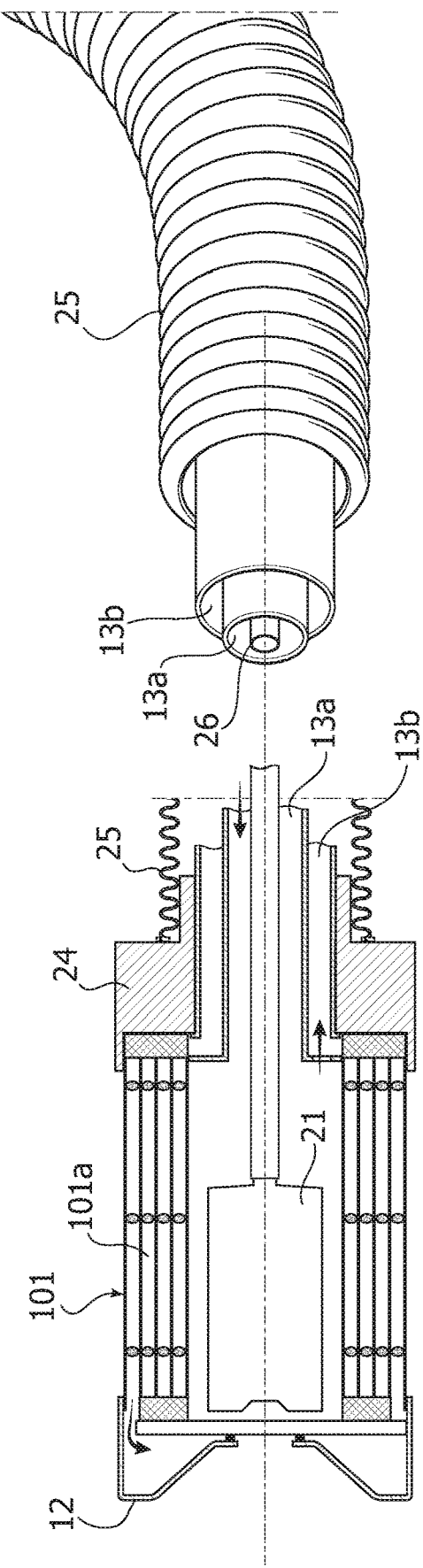

The system may be applied also to micro-cameras of an endoscope type by further reducing the spaces and the volume of air used, as in the embodiment illustrated in FIGS. 4A and 4B.

FIG. 4A is a lateral cross-sectional view of an embodiment of container 20 for an endoscope that comprises inside it a microcamera 21. Clearly, in this case, the dimensions are those of endoscopes, which have diameters for example comprised between 6 mm and 10 mm. Hence the container 20 may have a diameter of approximately 25 mm, but the dimensions may be different, for example according to whether use thereof is medical or industrial. Of course, those illustrated in the figures are embodiments provided by way of example, as are the applications mentioned. The solution described may also be applied to other fields of use, for example for aerospace or underwater purposes. Hence, in general, the cylindrical container 20 preferably has a diameter substantially corresponding to or less than that of an endoscope tube 25. From the standpoint of its structure, the cylindrical container 20 corresponds to the container of FIG. 1, except for the rear cover 24, which comprises a central opening 24—i.e., central with respect to the rear face 101e and to the innermost turn 101₁—so as to be coupled to an endoscope tube 25, which in the example is a semi-rigid corrugated tube, which comprises inside it the air-inlet tube 13, the inner tube 13a of which houses the supply cable 26 of the microcamera 21 and also a connecting optical fibre (not illustrated).

Specifically, the inlet duct 13 fits into the central opening 24. FIG. 4B is a perspective view the endoscope tube 25.

Hence, from what has been described above, the advantages of the solution proposed emerge clearly.

According to a main aspect of the solution described herein, the spiral-shaped path of the container in which air passes between layers of plastic in itself insulates the temperature of image-taking apparatus from the temperature of the environment in which the container is set, keeping the apparatus at a temperature close to the temperature of the temperature-regulating gas, for example room temperature, in particular, for instance, 25° C.

The effect of insulation within the container described herein is not afforded by a static material but by the thermal transfer through various layers of material that make up the rolled-up sheet, with different thermal properties (e.g., plastic/air), one of which, the air, is constantly renewed and introduced into the spiral path at the given temperature at which the image-taking apparatus is to be kept.

As regards the gas introduced via the inlet duct 13a, there occurs recycling of the gas itself, which is partially redirected, via the two or more holes 14c made in the connector of the rear cover 14, towards the gap that is formed between the inlet (inner) tube 13a and the coaxial outer tube 13b. This method considerably reduces the section (and the flexibility, where necessary) of the duct 13 itself.

The air conveyed for regulating the temperature of the image-taking apparatus is moreover advantageously used, at outlet from the spiral-shaped path, to eliminate any condensate that may be formed on the surface of the transparent window in the case where its temperature is lower than that of the working or chamber environment, outside the container, even in the case of high values of relative humidity.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A container for video or photographic image-taking apparatuses, said container comprising:
    a casing that includes a housing for housing an image-taking apparatus, said casing comprising a transparent window, an inner surface of which faces a lens of said image-taking apparatus,
    said casing including a sheet wound on itself in a spiral so as to define between facing surfaces of its own a spiral-shaped path, said housing being comprised in the innermost turn of said spiral-shaped path,
    said container further including a delivery duct formed in said housing and configured to convey a temperature-regulating gas at a given regulating temperature, into said housing and into said spiral-shaped path.

2. The container as set forth in claim 1, wherein said casing wound on itself in a spiral and includes a front open face and a rear open face, orthogonal to a winding axis, which are closed, respectively, by a front cover and a rear cover, said transparent window being applied to cover at least said front open face in a region corresponding to said innermost turn to close a front face of said housing, said transparent window having dimensions such as to leave uncovered at least a portion of said front face and of the spiral-shaped path, said front cover configured to convey said gas from said spiral-shaped path along an outer surface of said transparent window.

3. The container as set forth in claim 2, wherein said front cover includes a gap defined between an inner surface of said front cover and an outer surface of said transparent window that acts to convey said gas from said spiral-shaped path along an outer surface of said transparent window, said front cover comprising an opening through which an optical axis of the image-taking apparatus passes, said front cover being shaped so as to form at the opening a duct, the section of passage of which lies in a plane substantially perpendicular to the outer surface of the transparent window, and the perimeter of said section of passage is substantially tangential to the outer surface of the transparent window.

4. The container as set forth in claim 3, wherein the container further includes a sealing layer applied at least on said front open face and also on said rear open face, which defines an outer face, on which the transparent window is applied, a passage in said sealing layer applied on said front open face being provided in an area corresponding to said uncovered portion of said front open face and being coupled to said gap defined between the inner surface of said front cover and an outer surface of said transparent window.

5. The container as set forth in claim 1, wherein said delivery duct comprises an inner duct for delivery of the regulating gas into said housing and an outer duct coaxial to said inner duct for outlet of at least part of said regulating gas towards the outside.

6. The container as set forth in claim 1, wherein the container further includes spacers between the turns to keep said turns at a given distance, and wherein said spacers include restrictions, having a thickness smaller than said given distance.

7. The container as set forth in claim 1, wherein said container is associated to an endoscope, coupled to an endoscope tube of said endoscope, which comprises within it said delivery duct, said container having a diameter substantially corresponding to or smaller than the diameter of the endoscope tube, a rear cover comprising a central opening, i.e., central with respect to a rear face and to the innermost turn, for coupling to said delivery duct.

8. The container as set forth in claim 1, wherein said delivery duct is coupled to a pump for inlet of a gas at a pre-set temperature.

9. A method for operation of the container as set forth in claim 1, said method comprising the steps of:
    associating to said delivery duct a device for inlet, in particular a pump, of a gas, at a regulating temperature;

adjusting the temperature of said image-taking apparatus by adjusting said regulating temperature.

\* \* \* \* \*